US010415697B2

(12) United States Patent
Jerger

(10) Patent No.: US 10,415,697 B2
(45) Date of Patent: Sep. 17, 2019

(54) CONTROL OF A MULTI-SPEED VEHICLE TRANSMISSION

(71) Applicant: JAGUAR LAND ROVER LIMITED, Warwickshire (GB)

(72) Inventor: Rob Jerger, Coventry (GB)

(73) Assignee: JAGUAR LAND ROVER LIMITED, Whitley, Coventry (GB)

(*) Notice: Subject to any disclaimer, the term of this patent is extended or adjusted under 35 U.S.C. 154(b) by 375 days.

(21) Appl. No.: 15/319,966

(22) PCT Filed: Jun. 23, 2015

(86) PCT No.: PCT/EP2015/064087
§ 371 (c)(1),
(2) Date: Dec. 19, 2016

(87) PCT Pub. No.: WO2015/197604
PCT Pub. Date: Dec. 30, 2015

(65) Prior Publication Data
US 2017/0138467 A1 May 18, 2017

(30) Foreign Application Priority Data

Jun. 23, 2014 (GB) .................................. 1411124.9

(51) Int. Cl.
F16H 61/02 (2006.01)
B60W 40/076 (2012.01)
(Continued)

(52) U.S. Cl.
CPC ....... F16H 61/0213 (2013.01); B60W 40/076 (2013.01); F16H 59/48 (2013.01);
(Continued)

(58) Field of Classification Search
None
See application file for complete search history.

(56) References Cited

U.S. PATENT DOCUMENTS 5,531,654 A 7/1996 Ishikawa et al.
5,890,993 A 4/1999 Horiguchi et al.
(Continued)

FOREIGN PATENT DOCUMENTS

CN 1299751 6/2001
CN 101101238 1/2008
(Continued)

OTHER PUBLICATIONS

International Search Report and Written Opinion of the International Searching Authority for International application No. PCT/EP2015/0640987dated Sep. 28, 2015.
(Continued)

Primary Examiner — Jacob S. Scott
(74) Attorney, Agent, or Firm — Carlson, Gaskey & Olds

(57) ABSTRACT

A method and system of determining the instant gradient of a road, taking into account positive and negative drive torque, may be used to select one of a plurality of shift maps for a vehicle automatic transmission. The invention takes into account vehicle retardation due to braking, and permits consistent adoption of a shift map appropriate to the instant gradient.

15 Claims, 2 Drawing Sheets

(51) Int. Cl.
*F16H 59/54* (2006.01)
*F16H 59/66* (2006.01)
*F16H 59/48* (2006.01)
*F16H 59/74* (2006.01)

(52) U.S. Cl.
CPC ............ *F16H 59/54* (2013.01); *F16H 59/66* (2013.01); *F16H 59/74* (2013.01); *B60W 2510/069* (2013.01); *B60W 2510/0657* (2013.01); *B60W 2510/182* (2013.01); *B60W 2520/105* (2013.01); *F16H 2059/663* (2013.01); *F16H 2061/0227* (2013.01)

(56) References Cited

U.S. PATENT DOCUMENTS

| | | |
|---|---|---|
| 2003/0125862 A1 | 7/2003 | Horiguchi |
| 2007/0168103 A1* | 7/2007 | Scelers .................. F16H 59/66 701/67 |
| 2007/0293994 A1 | 12/2007 | Zerbini et al. |
| 2008/0249693 A1 | 10/2008 | Kresse |
| 2009/0018732 A1* | 1/2009 | Choby .................. F16H 59/66 701/51 |
| 2009/0043463 A1* | 2/2009 | Ly ...................... F16H 61/0213 701/51 |
| 2010/0268416 A1 | 10/2010 | Arai et al. |
| 2011/0035127 A1 | 2/2011 | Ishikawa et al. |
| 2014/0172253 A1 | 6/2014 | Palmer et al. |

FOREIGN PATENT DOCUMENTS

| | | |
|---|---|---|
| CN | 101994820 | 3/2011 |
| JP | S62113956 | 5/1987 |
| JP | H09207735 | 8/1997 |
| JP | 2003194203 | 7/2003 |
| JP | 2008045637 | 2/2008 |
| JP | 2009006834 A | 1/2009 |
| JP | 2009290963 A | 12/2009 |

OTHER PUBLICATIONS

Combined Search and Examination Report under Sections 17 and 18(3) for Application No. GB1411124.9 dated Jun. 23, 2016.
Combined Search and Examination Report under Sections 17 and 18(3) for Application No. GB1411124.9 dated Dec. 31, 2014.

* cited by examiner

CONTROL OF A MULTI-SPEED VEHICLE TRANSMISSION

TECHNICAL FIELD

This invention relates to multi-speed transmissions of motor vehicles, and methods and systems for effecting an automatic change of speed ratio according to road gradient. Aspects of the invention relate to a method of detecting from a vehicle the instant gradient of a road on which the vehicle is travelling whilst braking and selecting an appropriate transmission shift point, a method of detecting from a vehicle the instant gradient of a road on which the vehicle is travelling whilst braking, a controller of a multi-speed automatic vehicle transmission, a computer program, a system of determining the gradient of a road on which a vehicle is travelling, and a vehicle.

BACKGROUND TO THE INVENTION

Automatic control of multi-speed vehicle transmissions is well-known. Speed ratio changes are effected automatically, usually by reference to vehicle speed and accelerator pedal position. Thus typically an upshift will be delayed when accelerator pedal position is indicative of a demand for rapid acceleration, allowing engine speed to be greater at the shift point than for the case of a demand for lesser acceleration. The timing of a downshift may be adjusted in a similar manner.

Electronic control techniques permit automatic speed ratio change to be initiated according to an electronic shift map whereby factors such as road speed, engine output torque, and accelerator pedal position are provided as inputs to an electronic processor, and algorithms and/or look-up tables allow the instant shift point to be determined.

Many control systems for automatic transmissions include gradient recognition, whereby the shift point may vary according to the instant road gradient. Thus when travelling uphill, a lower speed ratio may remain engaged due to the raising of a shift point with respect to engine speed. Conversely a shift point may be at a reduced engine speed when on a downhill gradient. In practice a plurality of shift maps corresponding to gradient steps may be provided. These arrangements may be used to improve fuel efficiency of a vehicle engine as compared with a shift map which is insensitive to gradient, and may also better meet driver expectations.

One method of gradient determination compares instant engine torque against acceleration (rate of change of speed), and provides an algorithm to calculate gradient by reference to deviation from base data obtained from running a vehicle on a level road. Other factors which may be taken into account include vehicle mass, altitude and ambient temperature.

If the vehicle accelerates faster than indicated by base data, it may be assumed that the vehicle is on a down gradient, and if slower is on an up gradient. Likewise a level gradient can be detected after an up or down gradient has ceased. This measure may also be used to compensate for changes in acceleration due to high vehicle mass or due to a towed trailer.

One characteristic of the known method of gradient determination is that it may be influenced by application of the vehicle brakes. In particular if the vehicle brakes are applied, the gradient determination algorithm (relying upon engine torque and acceleration) becomes inaccurate because part of the torque generated by the engine is lost in overcoming braking torque. In such circumstances, the shift points of the transmission may be inconsistent, and the vehicle driver may wrongly conclude that a malfunction is indicated.

An apparatus and method of overcoming this effect would be desirable.

SUMMARY OF THE INVENTION

According to a first aspect of the invention, there is provided a method of detecting from a vehicle the instant gradient of a road on which the vehicle is travelling whilst braking and selecting an appropriate transmission shift point, the method comprising:

selecting, for an automatic transmission of the vehicle, a shift point appropriate to a determined instant gradient of a road on which the vehicle is travelling, wherein the determination of the instant gradient of the road is dependent on determination of a braking effort applied to the vehicle.

The method may comprise determining base data relating tractive effort of the vehicle with rate of change of speed of the vehicle on a level road. The method may comprise continually determining in real time tractive effort and rate of change of speed of a vehicle whilst travelling on a road. The method may comprise detecting braking of the vehicle. The method may comprise determining in real time the braking effort applied to the vehicle. The method may comprise continually summing the real time tractive effort and real time braking effort to give net effort data. The method may comprise determining real time data relating said net effort data to real time rate of change of vehicle speed whilst travelling on said road. The method may comprise comparing said base data and real time data to determine the instant gradient of the road on which the vehicle is travelling.

According to another aspect of the invention, there is provided a method of detecting from a vehicle the gradient of a road on which the vehicle is travelling whilst braking, the method comprising determining base data relating tractive effort of the vehicle with rate of change of speed of the vehicle on a level road; continually determining in real time tractive effort and rate of change of speed of a vehicle whilst travelling on a road; detecting braking of the vehicle, and determining in real time the braking effort applied to the vehicle; continually summing the real time tractive effort and real time braking effort to give net effort data; determining real time data relating said net effort data to real time rate of change of vehicle speed whilst travelling on said road; and comparing said base data and real time data to determine the gradient of the road on which the vehicle is travelling.

By tractive effort we mean the force propelling the vehicle on the road, and by braking effort we mean the retarding force applied to the vehicle by a braking system thereof. Propelling force is usually positive (+) and the retarding force may be considered negative (−) so that the sum thereof indicates the net effort tending to propel or retard the vehicle on the road.

Thus by comparison with base data, it can be determined if a vehicle is making a comparative acceleration or a comparative deceleration, and from this measure a determination of gradient is possible in real time.

One indicator of tractive effort is the output of internal combustion engine (engine torque) or other motive power source (such as an electric motor). In certain circumstances (i.e. overrun) the motive power source, in particular an internal combustion engine, may provide a negative torque—typically upon engine braking whilst coasting—so that in this instance a negative propelling force may be registered.

In an alternative, drive torque may be sensed or calculated, being the propelling torque available at the vehicle wheels. It will be understood that engine torque and drive torque are related according to the transmission speed ratio, final drive gear ratio and estimated friction losses in the vehicle drive train. Both engine torque and drive torque can be used as indicators of tractive effort in the present invention.

In one embodiment of the invention, tractive effort is determined by reference to engine output torque, having regard to the selected transmission speed ratio. Braking effort is determined by reference to output(s) of a vehicle anti-lock braking system (ABS) of known kind.

In an embodiment of the invention, gradient determination during braking permits selection of a transmission shift map appropriate to the gradient.

For purposes of this disclosure, it is to be understood that the controller(s) described herein can each comprise a control unit or computational device having one or more electronic processors. A vehicle and/or a system thereof may comprise a single control unit or electronic controller or alternatively different functions of the controller(s) may be embodied in, or hosted in, different control units or controllers. As used herein, the term "vehicle control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

According to a further aspect of the invention there is provided a computer program which, when run on a processor, causes one or more of the methods described herein to be performed.

According to a further aspect of the invention there is provided a non-transitory computer readable medium storing a computer program comprising computer program instructions, that, when performed by one or more processors, causes one or more of the methods described herein to be performed.

According to a further aspect of the invention there is provided an apparatus comprising: at least one memory storing computer program instructions; and at least one processor configured to execute the computer program instructions to cause the apparatus at least to perform one or more of the methods described herein.

According to a further aspect of the invention there is provided a controller of a multi-speed automatic vehicle transmission adapted to carry out one or more of the methods described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DESCRIPTION OF AN EMBODIMENT

Figure 1:
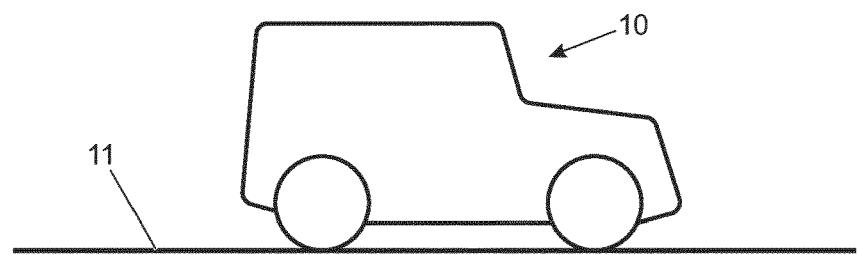
FIG. 1 illustrates a vehicle on a level road.

With reference to FIG. 1, a vehicle 10 is illustrated travelling on a level road 11. The vehicle is equipped with conventional systems providing the respective value of various parameters to an electronic controller, for example via a CAN-BUS or the like.

Figure 2:
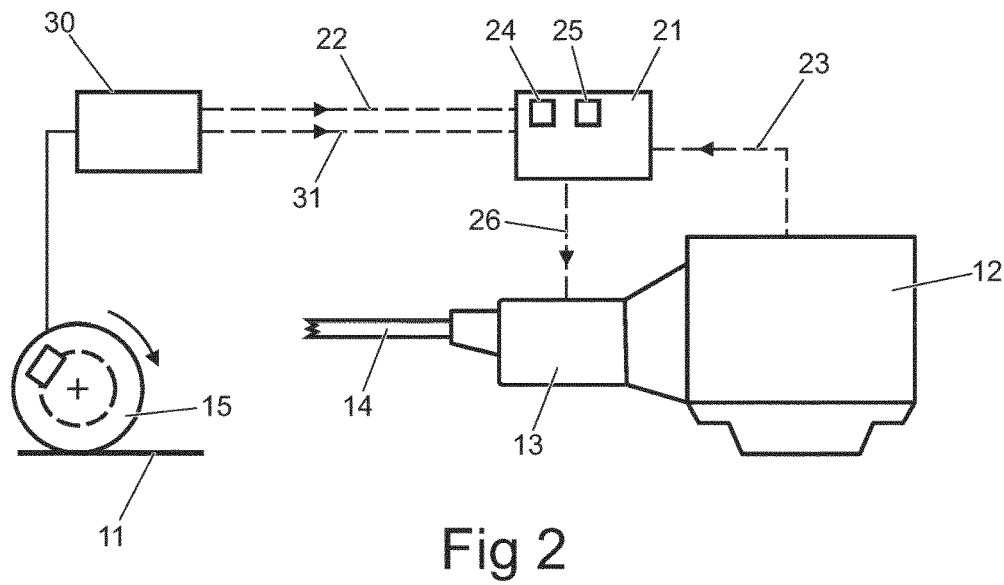
FIG. 2 illustrates schematically an embodiment of a system of the invention.

FIG. 2 illustrates an exemplar control system associated with a vehicle engine 12 and an automatic transmission 13 having multiple speed ratios, and an output drive shaft 14.

A transmission controller 21 controls automatic shifting of the transmission between speed ratios according to a road speed input 22 and a torque demand input 23, which may be a sensor of accelerator pedal position. The controller 21, typically an electronic processor 24, may take account of other factors including temperature, altitude and the like in order to select one of several shift maps of the transmission; the shift maps may be retained in a read only memory 25 and define different patterns of shift of the transmission via a shift signal 26.

Thus, for example the shift map for an up gradient may be different for that of a level road, so that upshift occurs at a higher engine speed. Many shift maps may be provided with suitable thresholds to determine correct application thereof. Alternatively the shift point may be interpolated according to the instant gradient between shifts maps of, for example, a level road and a steep gradient. The arrangement described thus far is conventional.

The vehicle may be fitted with a conventional anti-lock braking system (ABS) whereby wheel slip is automatically sensed upon braking, and in consequence braking effort is reduced at the slipping wheel in order to regain traction. Such systems are well-known, and typically also have an electronic control system 30 from which a signal 31 indicative of the value of braking effort may be derived. Inputs to the system 30 are from one or more wheels 15 of the vehicle. In the invention, such a signal is provided to the transmission controller 21, as will be described.

Braking effort may be calculated according to the hydraulic pressure in the vehicle brake system with reference to the friction coefficient of the friction material against the braking surface, typically brake pads acting against the brake rotor of a disc brake. Other methods are possible, including the use of strain gauge devices and brake torque transducers.

Conventionally, the performance of the vehicle is assessed to determine base data for a transmission shift map. Typically a base shift map is determined for a level road at sea level, and shift points are selected and defined by a relationship between engine output torque and rate of change of speed. In an alternative, vehicle drive torque is used, and it will be understood that engine output torque and vehicle drive torque (at the driven wheels) can be readily related by reference to the selected speed ratio, the final drive ratio and friction losses.

The invention may also take account of positive or negative torque applied via a hybrid drive system. Such a system may comprise an electric motor for supplying drive (positive torque) and for providing retardation by regenerative braking (negative torque).

In conventional use, real time engine output torque (or drive torque) is continually compared with rate of change of vehicle speed to determine whether the vehicle is performing according to base data. If rate of change of speed is greater than base data, a downhill gradient is indicated (vehicle accelerating), and if less than base data an uphill gradient is indicated (vehicle decelerating). Several uphill and downhill shift maps may be provided, and selected according to a respective threshold of gradient severity. Thus, for example, different uphill shift maps may be provided for gradients of 8%, 12% and so on, and the shift point may be interpolated according to instant gradient.

Figure 3:
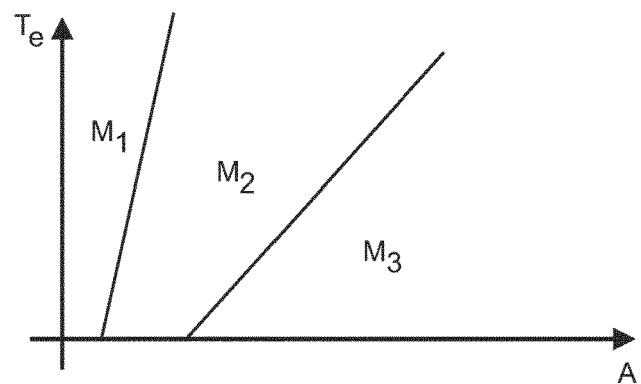
FIG. 3 illustrates graphically the selection of different transmission shift maps.

By way of example only FIG. 3 shows the regions of three shift maps $M_1$, $M_2$ and $M_3$ appropriate to increasing acceleration (A) and engine torque ($T_e$).

In conventional transmission controllers, braking of the vehicle wheels affects rate of change of speed of the vehicle (relative deceleration), but is not detected by a measure of engine output torque or drive torque. Accordingly the transmission may adopt an inappropriate shift map because the relative deceleration may be seen to be indicative of an uphill gradient when it is in fact caused by braking on level road or on a downhill gradient.

The present invention provides for braking torque to be calculated from inputs to the ABS controller 30, or derived from such inputs so that it may be summed with engine torque (or drive torque) to give a net value which may be related to real time rate of change of vehicle speed for comparison with base vehicle data. Such a comparison will give a true assessment of road gradient, from which an appropriate shift map may be determined.

Figure 4:
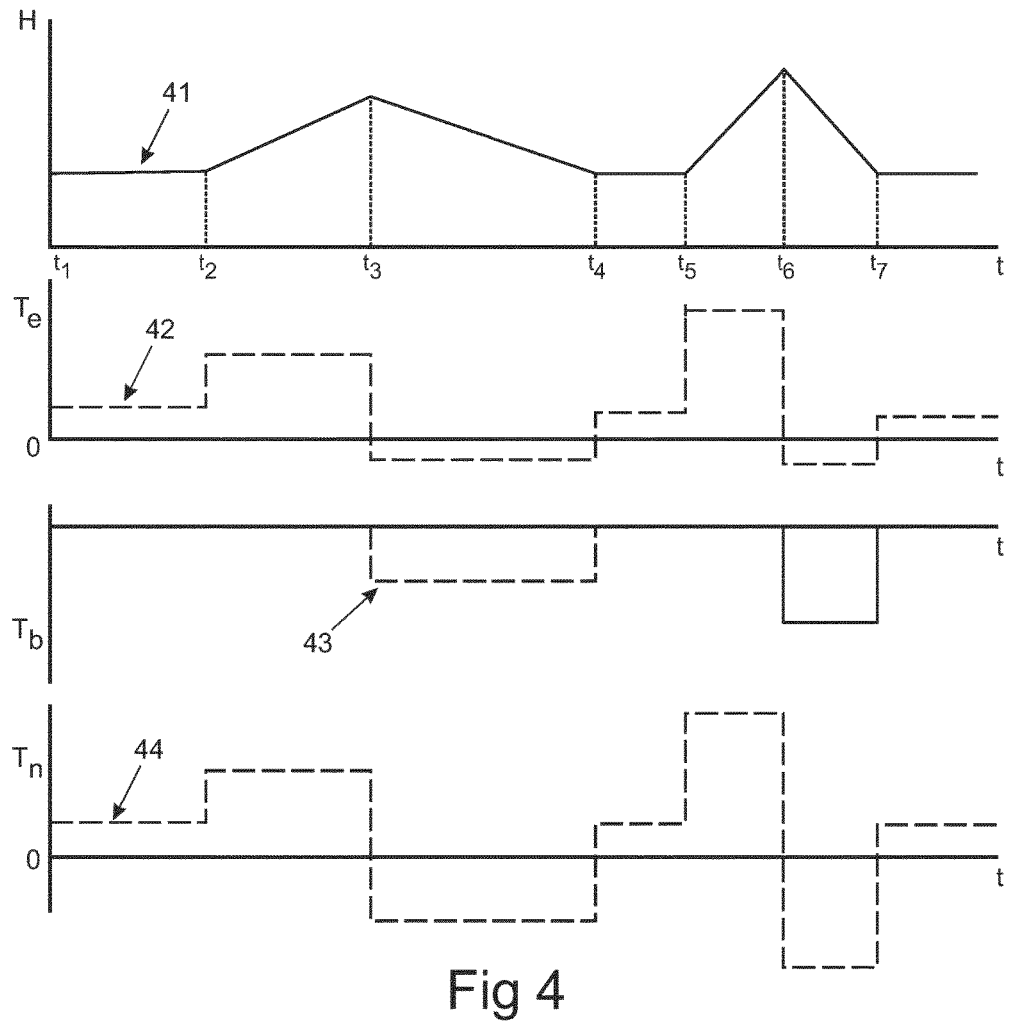
FIGS. 4 and 5 illustrate graphically positive and negative tractive effort for a vehicle travelling on an undulating road.

FIG. 4 illustrates by way of example the effect of a changing gradient profile for a conventional vehicle travelling at a steady speed, such as 50 kilometers per hour.

The road gradient is illustrated by trace 41 and indicates change of altitude (H) with time (t). The road is level from $t_1$ to $t_2$, goes uphill from $t_2$ to $t_3$, and downhill from $t_3$ to $t_4$. After a level period ($t_4$-$t_5$), the road goes more steeply uphill ($t_5$-$t_6$) and more steeply downhill ($t_6$-$t_7$) before another level period.

Engine torque ($T_e$) over this period is illustrated by trace 42, and necessarily increases in the first uphill phase $t_2$-$t_3$. In the first downhill phase ($t_3$-$t_4$), the vehicle engine is in an overrun mode and accordingly gives a negative torque due to engine braking.

The second uphill phase ($t_5$-$t_6$), engine torque increases to a higher level due to the steepness of the gradient, and engine braking contributes a negative torque in the second downhill phase ($t_6$-$t_7$).

Braking torque ($t_b$) is shown by trace 43, and is provided for both downhill phases, but is greater in the second phases ($t_6$-$t_7$) than in the first ($t_3$-$t_4$) due to the increased down gradient.

Net torque ($T_n$) is illustrated by trace 44, and shows the sum of engine torque and braking torque (braking torque being considered to be negative).

By comparison of the real time net torque ($T_n$) with base data, the true road gradient can be calculated, and accordingly an appropriate transmission shift map can be applied to the transmission by the controller 21.

Figure 5:
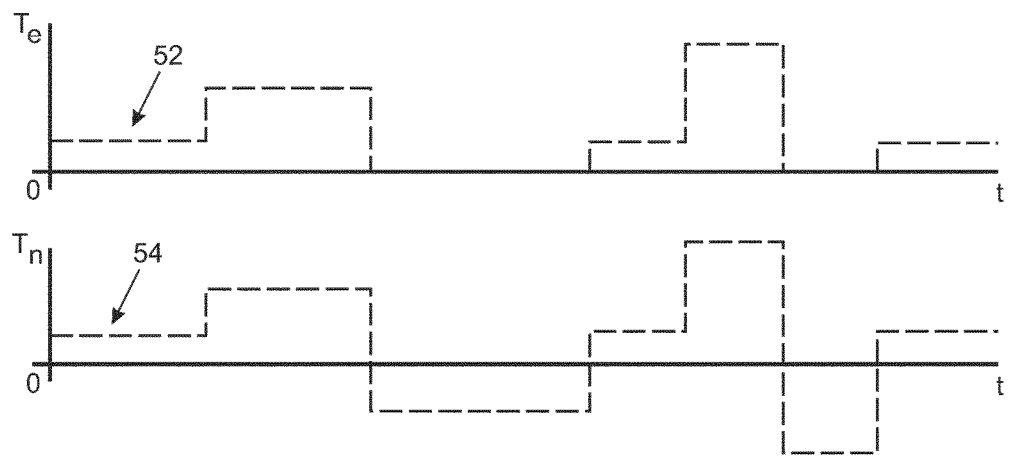

FIG. 5 illustrates the change in net torque for a vehicle in which the transmission shifts to neutral on a down gradient, thus eliminating engine braking, but providing a saving of fuel if the engine is stopped. Thus the trace 52 shows that the engine provides no negative torque in time periods $t_3$-$t_4$ and $t_6$-$t_7$ (corresponding to the down gradient) and as a result the net negative torque in these periods is a little less, as illustrated by trace 54.

Other modes of vehicle operation which contribute to tractive effort (positively or negatively) may be accounted for in a similar manner so as to allow the true net torque to be determined, the calculation being made in a suitable processor so as to allow selection of an appropriate transmission shift map.

Change and modifications to the invention are envisaged within the scope of the appended claims.

There may be provided a method of detecting from the instant gradient of a road on which a vehicle is travelling whilst braking, comprising:
  determining base data relating tractive effort of the vehicle with rate of change of speed of the vehicle on a road;
  determining the tractive effort and rate of change of speed of the vehicle whilst travelling on a road;
  detecting braking of the vehicle, and determining the braking effort applied to the vehicle;
  summing the tractive effort and braking effort to give net effort data;
  comparing the base data with the net effort data and rate of change of speed of the vehicle to determine the instant gradient of the road on which the vehicle is travelling.

Aspects of the invention will be apparent from the following numbered paragraphs.

1. A method of detecting from a vehicle the instant gradient of a road on which the vehicle is travelling whilst braking, the method comprising:
  determining base data relating tractive effort of the vehicle with rate of change of speed of the vehicle on a level road;
  continually determining in real time tractive effort and rate of change of speed of a vehicle whilst travelling on a road;

detecting braking of the vehicle, and determining in real time the braking effort applied to the vehicle;

continually summing the real time tractive effort and real time braking effort to give net effort data;

determining real time data relating said net effort data to real time rate of change of vehicle speed whilst travelling on said road; and comparing said base data and real time data to determine the instant gradient of the road on which the vehicle is travelling.

2. The method of aspect 1 wherein tractive effort is indicated by engine output torque.

3. The method of aspect 2 wherein engine output torque comprises engine braking.

4. The method of aspect 1 wherein braking effort is indicated by braking torque.

5. The method of aspect 4 wherein braking torque is determined from one or more parameters of an anti-lock braking system.

6. The method of aspect 1 comprising:

selecting for an automatic transmission of the vehicle, a shift point appropriate to the determined gradient.

7. The method of aspect 6 wherein said shift point is derived from a plurality of shift maps of said transmission.

8. A system of determining the gradient of a road on which a vehicle is travelling, said system comprising:

a source of base data relating tractive effort of the vehicle with rate of change of speed on a level road, a processor for determining in real time the tractive effort and rate of change of speed of a vehicle on a road, a detector for detecting braking of the vehicle and determining in real time the braking effort applied to the vehicle, a calculator for running real time tractive effort and real time braking effort, to give net effort data;

said processor being adapted to relate said net effort data to real time rate of change of vehicle speed, and by comparison with said base data to determine the instant gradient of the road on which the vehicle is travelling.

9. A system according to aspect 8 and comprising a read only memory containing said source of base data.

10. A system according to aspect 8 and comprising a controller of a multi-speed automatic vehicle transmission, said controller being responsive to the determined gradient to select an appropriate point shift of the transmission.

11. A system according to aspect 10 wherein said shift point is derived from a plurality of shift maps of the transmission, said shift maps being retained in a read only memory of said controller.

12. A system according to aspect 8 incorporated in a vehicle having a multi-speed automatic transmission.

13. A system according to aspect 12 and comprising an anti-lock braking system having an output adapted for determination of real time braking effort.

14. A vehicle having an automatic multi-speed transmission, a transmission controller for determining one of a plurality of transmission shift points for said transmission;

a memory containing base data relating tractive effort of the vehicle with rate of change of speed on a level road, and a processor for summing in real time positive and negative tractive effort applied to said vehicle, and for relating net tractive effort to said base data to determine the instant gradient of the road on which the vehicle is travelling, said transmission controller being adapted to select a transmission shift point appropriate to the determined road gradient.

15. A vehicle according to aspect 14 wherein said transmission controller comprises a plurality of shift maps of the transmission, each shift map defining a plurality of transmission shift points.

16. A vehicle according to aspect 14 and comprising an anti-lock braking system adapted to provide an output from which braking effort may be derived, said braking effort being a negative tractive effort.

17. A vehicle according to aspect 14 and adapted to determine engine output torque, said engine output torque being a positive tractive effort when advancing the vehicle.

18. A vehicle according to aspect 17 wherein said engine output torque is a negative tractive effort when retarding the vehicle.

The invention claimed is:

1. A method comprising:

determining base data relating a tractive effort of a vehicle with a rate of change of speed of the vehicle on a level road;

detecting braking of the vehicle while travelling on a road;

determining in real time a braking effort applied to the vehicle with reference to at least one output of a vehicle anti-lock braking system;

continually determining in real time a tractive effort and a rate of change of speed of the vehicle while travelling on the road;

continually summing the determined tractive effort and the determined braking effort to give net effort data;

determining real time data relating said net effort data to the rate of change of speed of the vehicle while travelling on the road;

determining an instant gradient of the road on which the vehicle is travelling, by comparing said base data and the real time data; and selecting, for an automatic transmission of the vehicle, a shift point appropriate to the determined instant gradient of the road on which the vehicle is travelling.

2. The method of claim 1, wherein the tractive effort is indicated by engine output torque.

3. The method of claim 2, wherein engine output torque comprises engine braking.

4. The method of claim 1, wherein said shift point is derived from a plurality of shift maps of said transmission.

5. A controller of a multi-speed automatic vehicle transmission, adapted to carry out the method according to claim 1.

6. A computer program stored on a non-transitory medium, said program, when run on a processor, causes the method according to claim 1 to be performed.

7. A system of determining a gradient of a road on which a vehicle is travelling, said system comprising:

a source of base data relating a tractive effort of the vehicle with a rate of change of speed on a level road;

a detector for detecting braking of the vehicle and determining in real time a braking effort applied to the vehicle, wherein the real time braking effort is determined with reference to at least one output of a vehicle anti-lock braking system;

a processor configured to determine in real time a tractive effort and a rate of change of speed of the vehicle on the road and to determine real time tractive effort and real time braking effort, to give net effort data;

said processor being configured to relate said net effort data to the real time rate of change of speed, and by comparison with said base data to determine an instant gradient of the road on which the vehicle is travelling.

8. The system according to claim 7, comprising a read only memory containing said source of base data.

9. The system according to claim 7, comprising a controller of a multi-speed automatic vehicle transmission, said controller being responsive to the determined gradient to select an appropriate shift point of the transmission.

10. The system according to claim 9, wherein said shift point is derived from a plurality of shift maps of the transmission, said shift maps being retained in a read only memory of said controller.

11. The system according to claim 7, incorporated in a vehicle having a multi-speed automatic transmission.

12. The system according to claim 11, comprising the anti-lock braking system having an output adapted for determination of the real time braking effort.

13. A vehicle comprising:
an automatic multi-speed transmission;
a transmission controller for determining one of a plurality of transmission shift points for said transmission;
a memory containing base data relating tractive effort of the vehicle with rate of change of speed on a level road,
a processor for summing in real time positive and negative tractive effort applied to said vehicle to determine net tractive effort, and for relating the net tractive effort to said base data to determine an instant gradient of the road on which the vehicle is travelling, and
an anti-lock braking system adapted to provide an output from which braking effort may be derived, said braking effort being a negative tractive effort,
said transmission controller being adapted to select a transmission shift point appropriate to the determined instant road gradient.

14. The vehicle according to claim 13, wherein said transmission controller comprises a plurality of shift maps of the transmission, each shift map defining a plurality of transmission shift points.

15. The vehicle according to claim 13, wherein said processor is configured to determine engine output torque, said engine output torque being a positive tractive effort when advancing the vehicle, and
wherein said engine output torque is a negative tractive effort when retarding the vehicle.

* * * * *